March 19, 1963

F. MAYER 3,081,624

APPARATUS FOR FURNISHING ELECTRICAL
SIGNALS FOR TORQUE MEASUREMENT

Filed Feb. 2, 1959

2 Sheets-Sheet 1

March 19, 1963
F. MAYER
3,081,624
APPARATUS FOR FURNISHING ELECTRICAL
SIGNALS FOR TORQUE MEASUREMENT
Filed Feb. 2, 1959
2 Sheets-Sheet 2
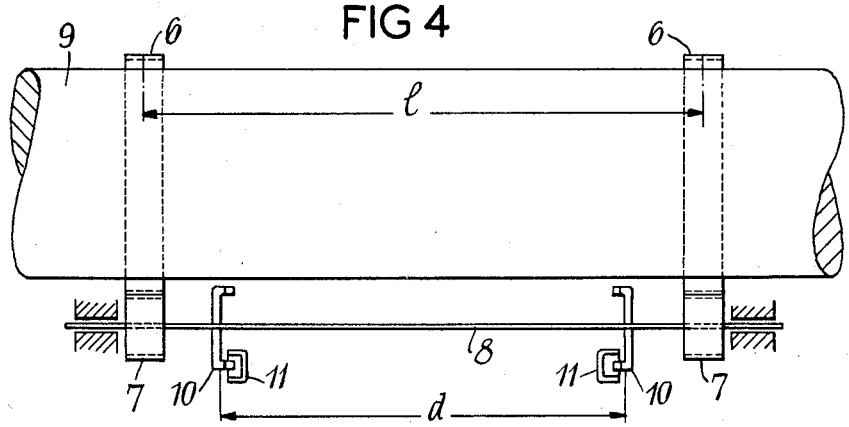
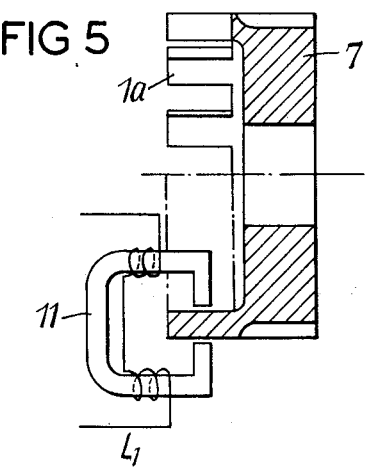
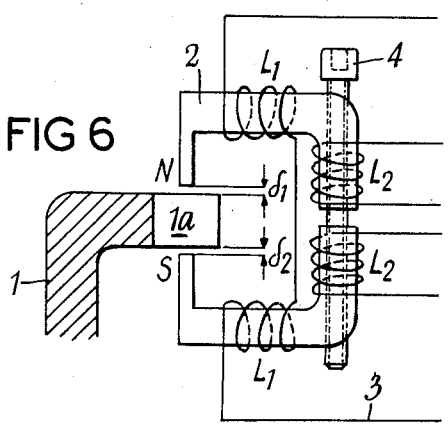

United States Patent Office 3,081,624
Patented Mar. 19, 1963

3,081,624
APPARATUS FOR FURNISHING ELECTRICAL SIGNALS FOR TORQUE MEASUREMENT
Friedrich Mayer, Sarnen, Switzerland, assignor to G. A. Messen-Jaschin, Sarnen, Switzerland, a company of Switzerland
Filed Feb. 2, 1959, Ser. No. 790,730
Claims priority, application Switzerland Feb. 5, 1958
5 Claims. (Cl. 73—136)

This invention relates to apparatus for furnishing electrical signals for torque measurement.

The invention is concerned with electrical generators or a torque meter of the kind in which the deflection of a rotating shaft due to the torque thereon is measured by making use of alternating signals derived from the stators of two electrical generators each having a rotor consisting of a toothed wheel mounted on the shaft co-axially therewith, the two wheels being spaced apart in the axial direction of the shaft.

It is an object of the present invention to provide electrical generators for this purpose in which a variation of the width of the air gap between the stator and the rotor has little or no influence on the transmitted electrical quantities.

According to the present invention there is provided an apparatus for furnishing electrical signals for torque measurement, comprising a shaft, first and second wheels which are spaced apart along the shaft and are fixedly mounted on the shaft and which constitute the rotors of first and second electrical generators, a ring of rectilinear teeth, co-axial with the shaft, on each rotor extending parallel to the shaft axis, each tooth having a root and a tip which is spaced from the root in the direction of the axis of the shaft and being so constructed that from its root to its tip the thickness, in the radial direction, is substantially constant and the width, in the peripheral direction, at any chosen radius is also substantially constant, first and second magnets disposed adjacent the first and second wheels, respectively, and constituting the stators of the generators, a first pole of each magnet disposed radially outwardly of the ring of teeth on the associated rotor, a second pole of each magnet disposed radially inwardly of the ring of teeth on the associated rotor and a winding on each magnet in which a signal voltage is induced as the shaft turns.

Figure 1:
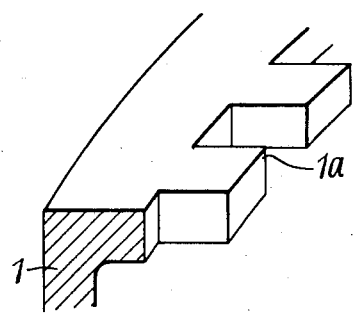
Figure 1A:
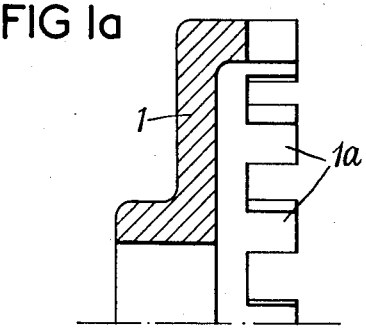
Figure 2:
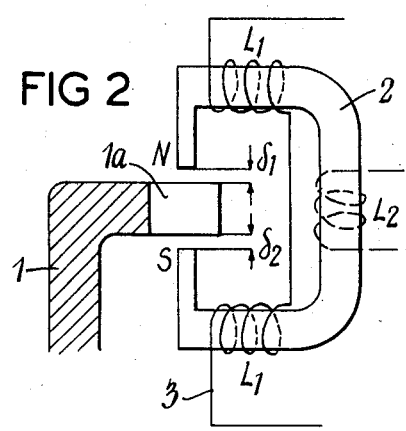
Figure 3:
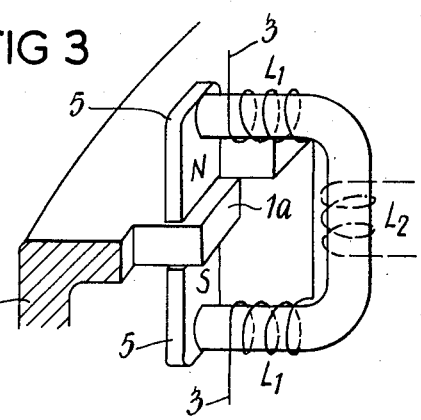
Figure 3A:
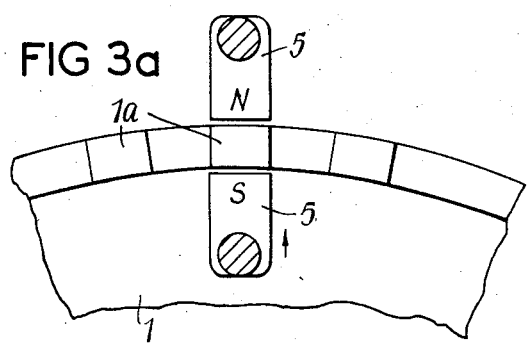
Figure 4A:
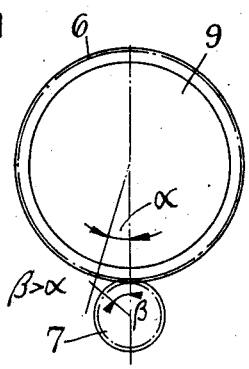

For a better understanding of the invention and to show how the same may be carried into effect, reference will now be made to the accompanying drawings in which:

FIGURES 1 and 1a illustrate, in perspective and in axial section respectively, a part of a toothed annulus constituting the rotor of a generator for a torque meter, FIGURES 2, 3 and 3a illustrate, in axial section, in perspective and in section seen in a plane perpendicular to the axis of the annulus, respectively, a part of the annulus with an associated magnetic pick-up system constituting the stator of the generator, FIGURES 4 and 4a show, in side elevation and in end elevation, respectively, an example in which the torque on one shaft is indirectly measured by measuring the angle of twist of a secondary shaft coupled by gearing to the first shaft, FIGURE 5 shows, in axial section, a detail of a variant of FIGURE 4, and FIGURES 6 illustrates, in axial section, a constructional example of a modified magnetic system suitable for use in the examples according to the preceding figures.

FIGURES 1 to 3 and 3a show an annulus 1 which is one of two annuli that are to be fixedly mounted, in spaced relation, upon a shaft (not shown) the torque of which is to be measured. The annuli are to be coaxial with the shaft and they constitute the rotors of two alternating current generators. Magnet systems, one of which is illustrated and is referenced 2, constitute the stators of the generators. Alternating voltages produced as the outputs of the stators are to be used in known manner to determine the torque on the shaft. The annulus 1 has teeth 1a but these are formed not radially on the periphery of the annulus, as in the constructions heretofore known (that is to say like a simple gear wheel), but in a cylindrical edge ring on the annulus such that the teeth extend parallel to the axis of the annulus. Thus the tip of each tooth is spaced from the root thereof in the direction of the axis, and not in the radial direction as heretofore. In order to obtain a rise of the magnetic flux which is as rectilinear and as steep as possible, it is necessary for the flanks of the teeth 1a of the annulus wheel 1 to be rectilinear, while the flanks of the teeth 1a must extend parallel to one another, that is to say the side faces of the recesses must be parallel to one another. If the magnetic systems constituting the stators were situated only on one side of the annulus, that is to say, for example, only radially outwardly of the annulus, the magnetic flux would vary in the event of fluctuation of the air gap width and would thus cause a variation in the electrical signal furnished by the stator winding. It is now proposed to employ a magnetic system as illustrated, for example, in FIGURE 2, wherein the rotating stator has an electromagnet system consisting of a generally C-shaped magnetic core having pronounced North and South poles N and S. Arranged in series on the magnetic core are two magnetizing windings $L_1$, which are connected in series, and an output winding $L_2$. If a current at constant voltage is employed for the windings $L_1$, the output voltage induced in the coil $L_2$ is independent of any variations of the air gap between the annulus 1 and the magnetic system. If a permanent magnet is employed instead of an electromagnet, it is unnecessary to use all the illustrated windings and the voltage changes resulting from the cyclic variations of the magnetic flux can be directly measured, or transmitted to an electrical measuring system, by way of, for example, the windings $L_1$, the winding $L_2$ in that case being omitted.

Rotating generator wheels mounted on a shaft can carry out rocking movements about the shaft axis, as well as radial movements. Therefore, in accordance with FIGURE 3, the magnet poles 5 are preferably so designed as to be very narrow in the direction parallel to the axis of the annulus.

By reason of the insensitivity of the electro-magnetic system, it is possible to construct a torque-measuring generator which will make an indirect measurement of the torque on a first shaft by measuring the angular deflection of a second shaft which extends parallel to the first and is coupled thereto, as by gearing. The basic principle of such an arrangement is illustrated in FIGURE 4. Two divided annular gear wheels 6 of equal size are fixedly mounted on a main shaft 9 at either end of the length $l$ over the measurement of angular deflection is to be effected. Meshing with the gear wheels 6 are two equal pinions 7 which are both fixedly mounted on a secondary shaft or torsion bar 8. The two generator rotors 10 are fixedly mounted on the torsion bar 8 at a distance $d$ from one another. The torsion bar 8 does not in this case directly act as a measuring member for the torque transmission, but serves only for biasing the two pinions 7. Naturally, this bias is accompanied by a torque which, however, can be made such in relation to the main torque transmitted by the shaft 9 that it has no effect on the measuring accuracy, or may be included in the measurement as a measured quantity. By reason of the fact that the gear ratio between each gear wheel 6 and the associated pinion 7 is not unity, any angular rotation of a gear wheel brings about a larger angular rotation of the associated pinion 7, in accordance with the transmission ratios $u$, whereby the angle of twist $\beta$ of the torsion bar 8 is approximately $u$ times greater than the angle of twist $\alpha$ of the main shaft, that is to say, that the angle of twist of the torion bar is dictated by the gear ratio on the one hand, and the twist of the shaft 9 within the measurement length $l$ on the other hand. It is thus possible to employ relatively small rotors for the generators.

In particular cases, the rotor of the generator may be constituted by an axial extension of the pinion 7. FIGURE 5 shows such a variant. The teeth extending parallel to the axis are similar in construction to those of the rotor 1 of FIGURES 1 and 1a but their pitch need not be the same as the pitch of the radial gear teeth. Various methods known in the gear art may be employed to ensure reliable engagement and disengagement of the gear wheels 6 and the pinions 7, while preventing tilting of the two pinions 7 in relation to the axis of the main shaft 9. The pinions 7 may also be elastically adapted to the main shaft 9 by known technical means in such manner that the engagement is maintained even in the event of deflection of the main shaft 9.

Extensive experiments have shown that the speed dependence obtained with inductively operating generators can be linearized by enlarging or so shifting the air gaps between the rotors and the magnets that the eddy current losses set up due to the magnetic flux are minimized. For effecting this minimization, the magnetic systems must be adapted individually and independently of one another to the magnetic flux conditions. FIGURE 6 illustrates an arrangement by means of which such an adaptation is possible. The rotor wheel 1 has axially projecting therefrom the teeth 1a, which are included in a closed path for the magnetic flux furnished either by means of a permanent magnet or by means of separately energized windings $L_2$. The output signal is derived from the windings $L_1$. The magnet system is divided along its horizontal central axis and thus consists of two U-shaped magnetic systems, these being connected together by a threaded bar 4, which has on its upper half a right-hand thread and on its lower half a left-hand thread, so that by rotating the bar 4 in one direction the width of the two air gaps $\delta 1$ and $\delta 2$ increase, whereas rotation in the other direction brings about a reduction in air gap width. The variation in one air gap is always equal to the variation of the other air gap. In the described manner, the magnetic systems individually mounted on the generator can be adjusted in accordance with the magnetic conditions of the said systems and of the particular rotor wheels concerned.

The stators may be adjustable angularly about the rotor axes, when the rotor is stationary, in order to set the zero point for calibration purposes.

I claim:

1. Apparatus for furnishing electrical signals for torque measurement, comprising a shaft, first and second wheels which are spaced apart along the shaft and are fixedly mounted on the shaft and which constitute the rotors of first and second electrical generators, a ring of rectilinear teeth, co-axial with the shaft, on each rotor extending parallel to the shaft axis, each tooth having a root and a tip which is spaced from the root in the direction of the axis of the shaft and being so constructed that from its root to its tip the thickness, in the radial direction, is substantially constant and the width, in the peripheral direction, at any chosen radius is also substantially constant, first and second magnets disposed adjacent the first and second wheels, respectively, and constituting the stators of the generators, a first pole of each magnet disposed radially outwardly of the ring of teeth on the associated rotor, a second pole of each magnet disposed radially inwardly of the ring of teeth on the associated rotor and a winding on each magnet in which a signal voltage is induced upon relative movement between said rotor and stator.

2. Apparatus according to claim 1, wherein the extent of each pole of the magnets, as measured in the direction of the periphery of the associated rotor, is large in relation to the width measured in the direction of the shaft axis.

3. Apparatus for furnishing electrical signals for torque measurement, comprising a main shaft the torque of which is to be measured, two spaced and equal gear wheels fixedly mounted on said shaft, a second shaft extending parallel to the main shaft, two spaced and equal gear wheels fixedly mounted on the second shaft and meshing with those on the main shaft, first and second wheels which are spaced apart along the second shaft and are fixedly mounted on that shaft and which constitute the rotors of first and second electrical generators, a ring of rectilinear teeth, co-axial with the second shaft, on each rotor extending parallel to the shaft axes, each tooth having a root and a tip which is spaced from the root in the direction of the axis of the shaft and being so constructed that from its root to its tip the thickness, in the radial direction, is substantially constant and the width, in the peripheral direction, at any chosen radius is also substantially constant, first and second magnets disposed adjacent the first and second wheels, respectively, and constituting the stators of the generators, a first pole of each magnet disposed radially outwardly of the ring of teeth on the associated rotor, a second pole of each magnet disposed radially inwardly of the ring of teeth on the associated rotor and a winding on each magnet in which a signal voltage is induced as the second shaft turns.

4. Apparatus for furnishing electrical signals for torque measurement, comprising a main shaft the torque of which is to be measured, two spaced and equal gear wheels fixedly mounted on said shaft, a second shaft extending parallel to the main shaft, first and second spaced and equal gear wheels fixedly mounted on the second shaft, meshing with those on the main shaft and constituting the rotors of first and second generators, respectively, a ring of retilinear teeth, co-axial with the second shaft, formed on each rotor and extending parallel to the shaft axes, each tooth having a root and a tip which is spaced from the root in the direction of the axis of the shaft and being so constructed that from its root to its tip the thickness, in the radial direction, is substantially constant and the width, in the peripheral direction, at any chosen radius is also substantially constant, first and second magnets disposed adjacent the first and second rotors, respectively, and constituting the stators of the generators, a first pole of each magnet disposed radially outwardly of the ring of teeth on the associated rotor, a second pole of each magnet disposed radially inwardly of the ring of teeth on the associated rotor and a winding on each magnet in which a signal voltage is induced as the second shaft turns.

5. Apparatus for furnishing electrical signals for torque measurement, comprising a shaft, first and second wheels which are spaced apart along the shaft and are fixedly mounted on the shaft and which constitute the rotors of first and second electrical generators, a ring of rectilinear teeth, co-axial with the shaft, on each rotor extending parallel to the shaft axis, each tooth having a root and a tip which is spaced from the root in the direction of the axis of the shaft and being so constructed that from its root to its tip the thickness, in the radial direction, is substantially constant and the width, in the peripheral direction, at any chosen radius is also substantially constant, first and second magnets disposed adjacent the first and second wheels, respectively, and constituting the stators of the generators, a first magnet part of each stator including one pole of the magnet, a second magnet part of each stator including the other pole of the magnet, portions of the first magnet part defining a first hole which extends radially with respect to the shaft axis and which has a left-hand internal screw thread, portions of the second magnet part defining a second hole which is aligned with the first hole and has a right-hand screw thread, and a bolt which is entered in the two holes and is formed with a left-hand screw thread at one end and a right-hand screw thread at the other end for cooperation with the screw threads in the respective holes, one pole of each magnet being disposed radially outwardly of the ring of teeth on the associated rotor and the other pole disposed radially inwardly of the ring of teeth on the associated rotor, and a winding on each magnet in which a signal voltage is induced as the shaft turns.

References Cited in the file of this patent

UNITED STATES PATENTS

| | | |
|---|---|---|
| 2,193,079 | Schrader | Mar. 12, 1940 |
| 2,521,905 | Feller | Sept. 12, 1950 |
| 2,947,168 | Yang | Aug. 2, 1960 |

FOREIGN PATENTS

| | | |
|---|---|---|
| 660,438 | France | Feb. 19, 1929 |
| 644,192 | Great Britain | Oct. 4, 1950 |